May 18, 1937.  E. H. SMITH  2,081,022
BEER DISPENSING APPARATUS
Filed March 25, 1935  2 Sheets-Sheet 2
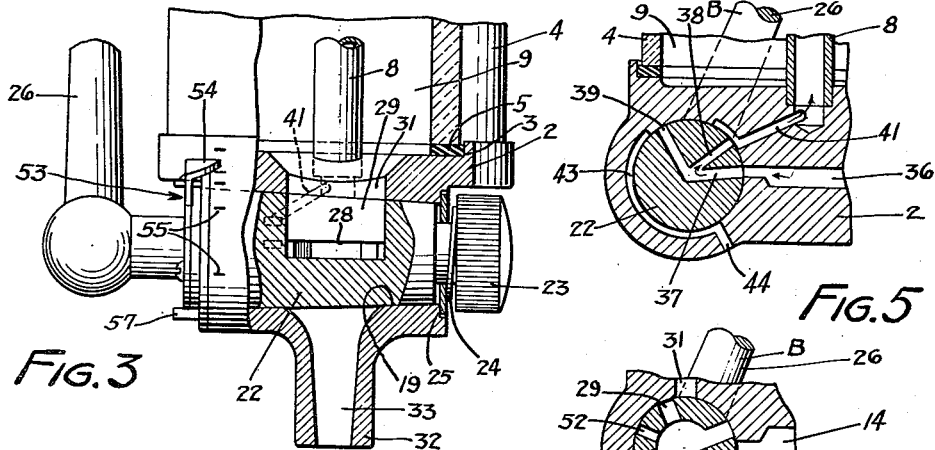
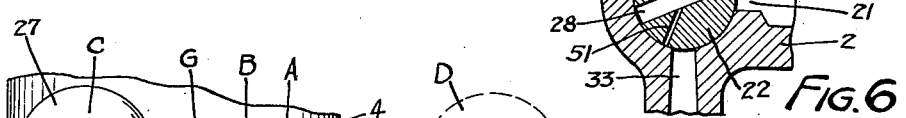
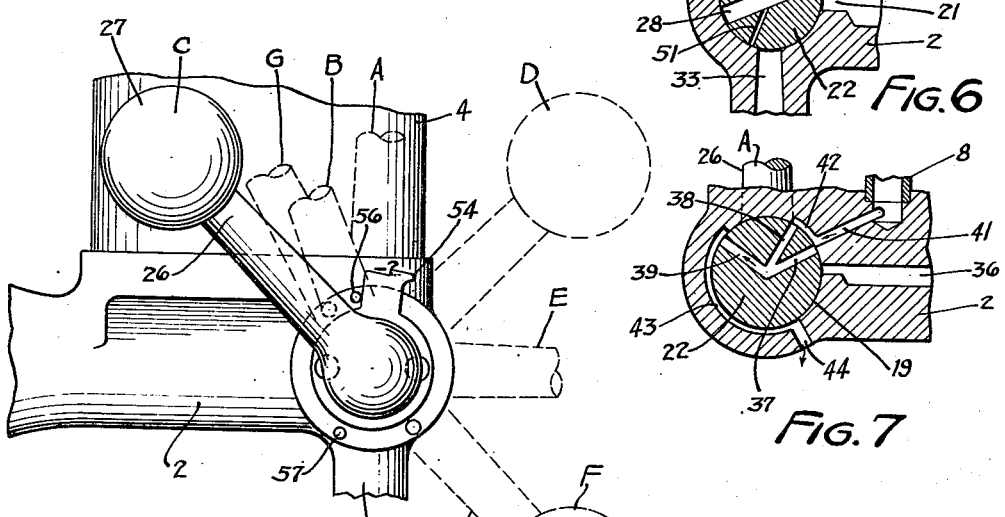
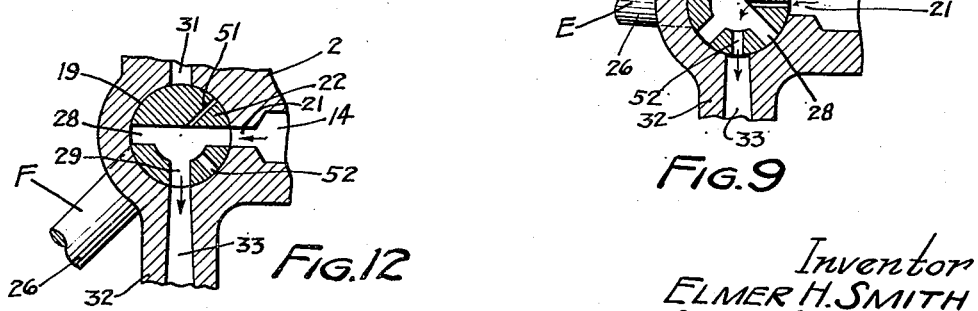
Inventor
ELMER H. SMITH
By Paul, Paul & Moore
ATTORNEYS Patented May 18, 1937

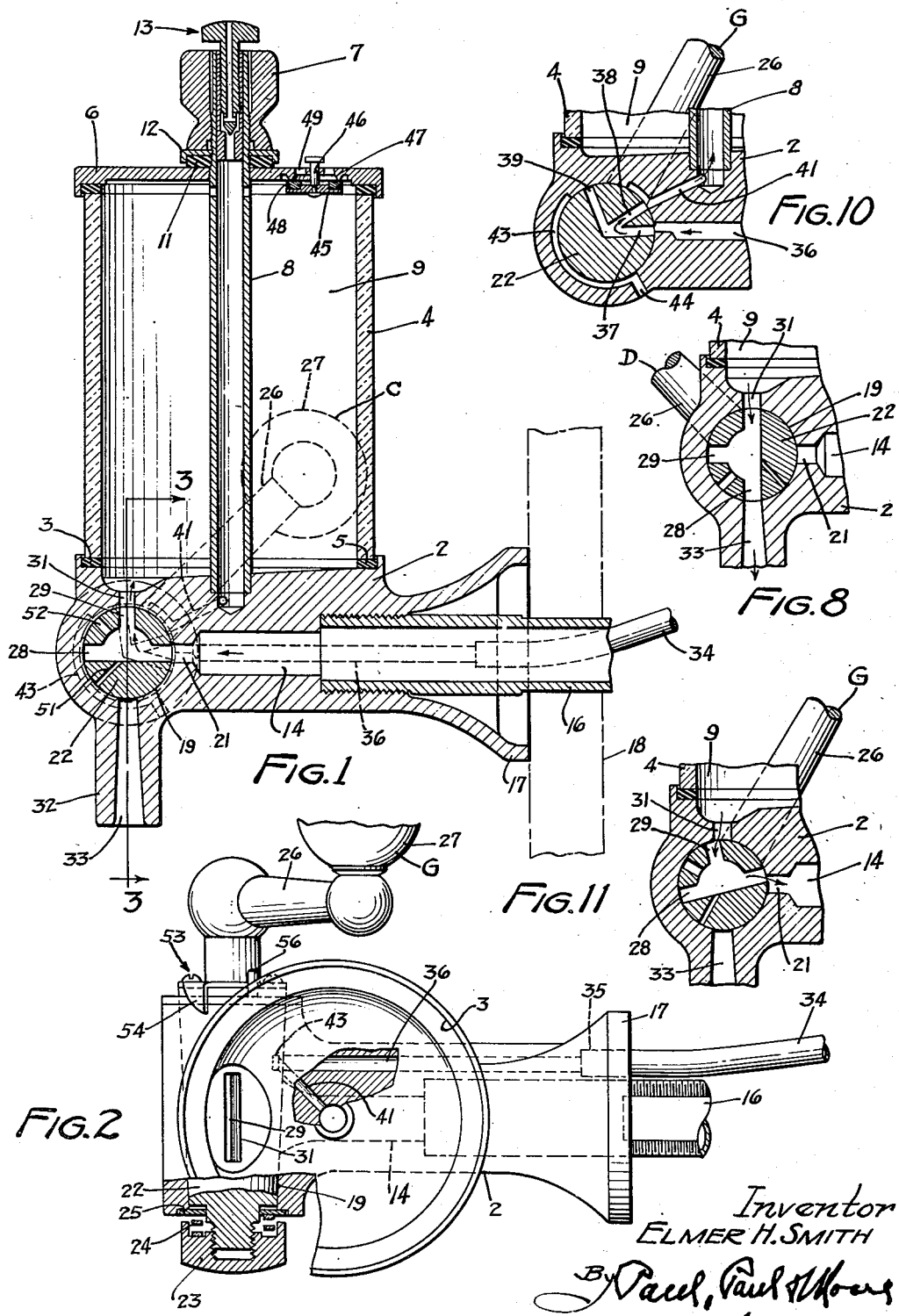

2,081,022

UNITED STATES PATENT OFFICE 2,081,022

BEER DISPENSING APPARATUS

Elmer H. Smith, Minneapolis, Minn., assignor to Smith Welding Equipment Corporation, Minneapolis, Minn., a corporation of Delaware Application March 25, 1935, Serial No. 12,878

16 Claims. (Cl. 225—9)

This invention relates to new and useful improvements in beer dispensing apparatus of the general character disclosed in my pending application, Serial Number 746,328, filed October 31, 1934.

The structure disclosed in the present application embodies several improvements in the constructional details of the faucet which are desirable in order to provide an apparatus of this character which is efficient and practical in operation.

An object of the present invention is to provide a beer faucet comprising a pressure chamber having means in an upper wall portion thereof for admitting air into the chamber, when beer is withdrawn therefrom, and whereby the beer may be quickly drained from the chamber.

A further object is to provide a beer dispensing faucet having means whereby each glass of beer drawn from the apparatus may be provided with the desired size of head or cap by the simple manipulation of the control handle.

A further object is to provide a beer dispensing apparatus or faucet having means for facilitating cleaning, and whereby the beer remaining in the pressure chamber and the pipe connections between it and the source of supply such as the keg or barrel, may be drained back into the keg or barrel, when it is desired to clean the faucet and the pipe connections, thereby effecting economy, in that the beer in the faucet and the beer line is not wasted.

Other objects reside in the novel construction of the various details of the faucet, and in the organization of the various parts thereof, whereby the faucet may be manufactured at a comparatively small cost, and whereby the drawing of the beer from the barrel may be conveniently controlled so that each glass will be provided with the desired amount of foam.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a vertical sectional view of the apparatus showing the valve positioned to permit the beer to flow from the barrel into the pressure chamber;

Figure 2 is a plan view of Figure 1 with the upper portion of the structure removed, and partially broken away to more clearly show the construction thereof;

Figure 3 is a detail sectional view on the line 3—3 of Figure 1;

Figure 4 is a side elevation of the faucet showing in full and dotted lines the various positions of the operating handle;

Figure 5 is a detail sectional view showing the valve positioned to admit air into the pressure chamber;

Figure 6 is a detail sectional view with the valve positioned as in Figure 5, but showing the relative position of the beer passage in the valve;

Figure 7 is a view showing the valve in its neutral or normal position wherein the air duct to the pressure chamber is opened to permit the air to escape therefrom;

Figure 8 is a view showing the position of the valve when drawing the beer from the pressure chamber into a glass;

Figure 9 is a view showing the position of the valve when applying a head or a cap of foam to the beer in the glass;

Figure 10 is a view showing the position of the valve when the beer in the pressure chamber is drained back into the barrel;

Figure 11 is a view showing the handle positioned as in Figure 10, but showing the beer passage in the valve partially open to permit the beer to drain from the pressure chamber back into the beer line and barrel; and Figure 12 is a view showing the valve as positioned when drawing the beer directly from the barrel into the glass.

The beer faucet herein disclosed is similar in appearance to the one disclosed in my pending application, above mentioned, and comprises a body 2 having an annular seat 3 at its upper portion adapted to receive a container 4, the lower edge of which is seated upon a suitable gasket 5 to provide a leak-proof joint.

A plate 6 is seated upon the upper end of the container 4 and is secured in position by a nut 7 received in threaded engagement with the upper end of a tube 8, which traverses the chamber 9 formed by the walls of the container 4 and plate 6. The lower end of said tube is suitably secured to the body 2 as, for example, by screw threads, clearly illustrated in Figure 1. A suitable gasket 11 is interposed between the plate 6 and the washer 12 against which the lower end of the nut 7 is seated, and whereby a leak-proof connection is provided between the walls 6 and the nut 7. A suitable valve, generally indicated by the numeral 13, is provided in the nut 7, whereby communication may be established between the interior of the chamber 9 and the atmosphere to permit the beer to rise without turbulence, into the chamber 9 when the plug valve, generally indicated by the numeral 22, is positioned as shown in Figure 1. The construction of the valve 13 and the tube 8 is shown and described in my pending application, hereinbefore mentioned, and it is therefore unnecessary to herein describe the same in detail.

The body 2 is shown provided with a beer passage 14 terminating at one end in a threaded socket adapted to receive one end of a pipe 16, the opposite end of which is suitably connected to the beer supply barrel, not shown. The body 2 is also shown having a flanged head 17 adapted to be seated against a suitable support 18, indicated in dotted lines in Figure 1.

The opposite end of the beer passage 14 communicates with a tapered bore 19 through a restricted passage 21. A suitable plug valve 22 is rotatably supported in the tapered bore 19 and is retained therein by an adjusting nut 23, received in threaded engagement therewith, as best shown in Figure 2, and whereby the plug valve 22 is retained in leak-tight engagement with the walls of the bore 19. A suitable spring 24 is interposed between the adjusting nut 23 and a washer 25 shown seated in a recess in the wall of the body. This spring constantly urges the plug valve in a direction towards the right, when viewed as shown in Figure 3.

A suitable operating handle 26 is secured to the opposite end of the plug valve 22 and is shown provided with a spherical hand grip 27 which may be conveniently grasped by the hand to manipulate the plug valve.

The plug valve 22 has a passage 28 extending transversely therethrough and this passage has a branch 29 disposed at right angles thereto, which is adapted to communicate with an opening 31 in the upper portion of the body 2, to thereby establish communication between the pressure chamber 9 and the passage 28 of the plug valve, as best shown in Figure 1. When the valve 22 is positioned as shown in this figure, communication is established between the pressure chamber 9 and the beer supply line 16, whereby beer will flow under pressure from the beer line 16 into the chamber 9, as will subsequently be described.

A suitable nozzle 32 is provided on the lower portion of the body 2, which has a discharge opening 33 therein, the upper end of which communicates with the tapered bore 19, as clearly illustrated in Figures 1 and 3. When beer is to be drawn from the chamber 9 into a glass, the plug valve 22 is rotated to the position shown in Figure 8, whereby the passage 28 establishes direct communication between the pressure chamber 9 and nozzle 32, thereby permitting beer to drain by gravity from the pressure chamber.

The means for supplying air under pressure to the chamber 9, is shown comprising a tube 34 having one end connected to the body 2, as indicated at 35 in Figures 1 and 2, and its opposite end to a suitable supply of air under pressure such, for example, as the usual means for supplying air to the keg or barrel, not shown. An air passage 36 connects the end of the tube 34 to the tapered bore 19 of the valve 22, and is adapted to register with a duct 37 in the plug valve, when the latter is positioned as shown in Figures 5 and 10. The passage 37 is shown extending inwardly to the center of the plug valve and connects with radially disposed ports 38 and 39. The port 38 is adapted to communicate with one end of a duct 41 in the body 2, the other end of which communicates with the tube 8. When the plug valve is positioned as shown in Figure 5, air under pressure is delivered into the chamber 9 from the supply tube 34 until the pressure in the chamber 9 equalizes the pressure in the keg or barrel, it being understood that the tube 34 is connected to the same source of air supply as the keg or barrel.

The wall of the bore 19 is provided with a cutaway portion 42 communicating with the port 41, and the wall of said bore is also cut away, as indicated at 43, which cutaway portion communicates with an orifice 44 in the lower wall of the bore 19. When the plug valve is in the position shown in Figure 5, as when admitting air into the chamber 9, the port 39 is closed so that the air circulates from the air passage 36 through the ports 37 and 38, port 41, and tube 8 into the chamber 9. To release the air from the pressure chamber, the handle 26 is returned to its normal position, indicated at A in Figure 7, whereby the port 37 is moved out of registration with the air passage 36 and the port 39 into registration with the cutaway portion 43, whereby the air is released from the chamber through the orifice 44, as will readily be understood by reference to Figure 7. The operation of admitting air under pressure into the chamber 9 and releasing it therefrom is similar to that shown and described in my pending application, hereinbefore mentioned.

One of the important features of the present invention resides in the provision of means for permitting the beer in the pressure chamber 9 to quickly drain therefrom, when the valve 22 is positioned as shown in Figure 8.

Such means is best shown in Figure 1 and comprises a suitable disk valve 45, shown secured to one end of a stem 46, slidable in a suitable guide provided in the top wall 6 of the chamber 9. An annular seat 47 is provided in the lower surface of the plate 6 adapted to be engaged by a gasket 48 secured to the disk valve 45 to thereby close the apertures 49 provided in the wall 6.

In Figure 1, the disk valve 45 is shown closed, the position assumed when beer is being delivered into the chamber 9 from the supply pipe 16. As hereinbefore stated, when beer is thus being delivered into the chamber 9, the air pressure therein is substantially equal to the pressure in the barrel, whereby the beer will flow into the chamber without turbulence, controlled by the valve 13. In the structure herein disclosed, the valve 13 merely provides a means for permitting the air in the chamber to gradually escape therefrom to permit the beer to flow into the chamber. The air delivered into the chamber under pressure, as above stated, will cause the disk valve 45 to immediately close, as shown in Figure 1, when the ducts 37 and 38 register with the ducts 36 and 41, respectively, as shown in Figure 5, so that the only air escaping from the chamber during the filling operation of the chamber 9 is through the vent valve 13.

When the valve 22 is rotated from the position shown in Figure 1 to that shown in Figure 8, the beer in the chamber will quickly drain from the pressure chamber 9 as a result of the disk valve 45 which, because of the vacuum which tends to form in the chamber 9 above the level of the liquid therein, will cause the valve 45 to quickly open, thereby presenting a large air intake to the chamber, with the result that the beer will quickly drain from the chamber in a smooth, non-turbulent stream. The valve disk 45, therefore, is important in that it clearly expedites the operation of draining the beer from the chamber 9 without turbulence or agitation.

Another feature of the invention resides in the provision of means whereby, should the beer in the keg become relatively "flat" or lifeless, so that when drained from the chamber 9 into a glass, it does not have the desired amount of foam thereon. A small quantity of beer may be drawn directly from the keg into the glass through a relatively small orifice, whereby the beer becomes so agitated that it is delivered into the glass through the nozzle 32 in the form of a rich, creamy foam.

The means provided for thus capping the beer is best shown in Figure 9, wherein it will be noted that the plug valve 22 has been rotated so as to cut off communication between the beer passage 14 and the opening 31 in the bottom of the chamber 9. When the plug valve 22 is thus positioned, a small orifice 51 provided in the valve 22, registers with the beer passage 14 and establishes communication between this passage and the transverse passage 28 in the valve. A relatively large port 52 is also provided in the valve 22 and establishes communication between the opening 33 in the nozzle 32 and the passage 28 of the valve. Thus, it will be seen that when the valve is positioned as shown in Figure 9, a small portion of the beer in the passage 14 of the valve body will flow through the small orifice 51 at relatively high velocity, and into the passage 28 of the valve, from whence it will discharge from the port 52 directly into the passage 33 of the nozzle. Because of the extremely small diameter of the orifice 51, the beer will flow therethrough at a relatively high velocity, whereby it is practically all converted into a rich, creamy foam, which is delivered into the glass on top of the beer therein, thereby to provide the desired size of head or cap. It is to be noted that when the valve 22 is positioned as shown in Figure 9, the only escape of the beer from the passage 14 is through the orifice 51, port 52, and passage 33 in the nozzle.

Another feature of considerable importance in the present application resides in the means provided whereby the beer in the pressure chamber 9 may readily be drained back into the barrel at the end of the day, or at any time when it is desired to drain said chamber and the beer line of its contents for cleaning or other purposes. In structures of this general character now in common use, the beer which is contained in the valve or beer faucet, and in the supply line thereto, is usually wasted, if it becomes necessary to disconnect the pipe line from the keg for cleaning purposes, as no means is provided whereby the beer in the pipe line and faucet may be drained back into the barrel.

This is made possible in the present apparatus by the particular arrangement of the air ducts in the plug valve 22 with respect to the beer passages 28 and 29. All of these ducts and passages are so arranged in the valve 22 that when the valve is rotated to the position shown in Figure 11, it is to be noted that the passages 28 and 29 partially overlap the openings 21 and 31, respectively, so that communication is provided between the beer line and the chamber 9. When the plug valve is thus positioned, the air ducts 37 and 38 in the valve are also in registration with the air passages 36 and air duct 41 in the valve body, whereby the pressure in the chamber 9 and barrel is substantially equalized, thereby permitting the beer to flow by gravity from the chamber 9 back through the beer line or pipe 16 and into the barrel until said chamber and the beer line are completely drained of their contents. The operating handle may then be returned to its normal upright position, indicated at A in Figure 7. When the operating handle is thus positioned, it is to be understood that the beer passages 28 and 29 of the valve 22 are out of registration with the passages 14 and 31 in the valve body so that the valve is completely closed to the flow of beer. The pressure chamber, however, is open to the atmosphere through the ports in the plug valve, as shown in Figure 7, and also by means of the disk valve 45 in the upper wall of the chamber, which normally is open.

A suitable indicating device, generally indicated by the numeral 53 in Figure 3 is provided for the convenience of the operator, whereby he may readily note the various positions of the valve in the operation of drawing beer from the apparatus. This indicating device may consist of a pointer 54 carried by the plug valve 22 and cooperating with a series of marks 55 on the valve body to thereby indicate the position of the plug valve. Suitable stops 56 and 57 are positioned to be engaged by the pointer 54, thereby to limit the swinging movement of the operating handle 26. These stop pins are shown in Figures 2 and 4.

*Operation*

In the operation of this novel beer dispensing apparatus, the operating handle 26 is initially moved from its upright position A, indicated in dotted lines in Figure 4 and full lines in Figure 7, to the position indicated at B in Figures 4, 5, and 6. When positioned at B, the air ducts 37 and 38 of the plug valve are moved into registration with the air passages 36 and 41 in the valve body, whereby air under pressure is delivered into the pressure chamber 9 until the pressure therein is substantially equal to the pressure in the barrel. The handle 26 is then moved forwardly to the position C, indicated in Figures 1 and 4, whereby the air ports are closed and the beer passages 28 and 29 moved into registration with the openings 21 and 31, respectively, in the valve body, to thereby establish communication between the chamber 9 and the beer line 16.

Upon the initial delivery of air under pressure into the chamber 9, the disk valve 45 is closed to prevent the escape of air therethrough and whereby the flow of beer into the chamber 9 is controlled entirely by manipulation of the vent valve 13, which may be permanently adjusted so that the beer will flow into the chamber 9 at a velocity which will not agitate it and cause it to foam therein.

When a sufficient quantity of beer has been delivered into the chamber 9, the operator returns the operating handle to the position D, shown in Figures 4 and 8, whereby the passage 28 in the plug valve establishes direct communication between the opening 31 and the bottom of the chamber 9 and the discharge nozzle 32, whereby the beer may quickly drain from the chamber into the glass. When the beer is thus draining into the glass, the valve 45, as hereinbefore stated, is opened to permit free inflow of air to the chamber 9 to thereby prevent the formation of a vacuum therein which may tend to retard the flow of beer therefrom.

Should the beer, when delivered into the glass from the nozzle 32, be found to have an insufficient head thereon, the operator moves the handle forwardly to position E, whereupon the small orifice 51 is moved into communication or registration with the beer passage 14 of the beer line, whereby beer is drawn directly from the beer line into the glass without passing through the pressure chamber 9. Because of the extremely small diameter of the orifice 51, the beer will be delivered into the glass in the form of a rich, creamy foam, as hereinbefore stated, whereby each glass of beer may be provided with a sufficient head of foam.

Should the operator, for some reason, desire to draw beer directly from the barrel into the glass in the usual manner, he may do so by swinging the operating handle 26 downwardly from the position E to the position F shown in dotted lines in Figure 4, whereby the beer passages 28 and 29 in the plug valve 22 are moved into registration with the beer opening 21 of the beer line and the orifice 33 of the discharge nozzle, as best shown in Figure 12, thereby causing the beer to flow directly from the beer line into the glass. To thus draw the beer directly from the barrel into the glass, will be found desirable, particularly when the beer in the barrel has become partially flat, as it will obviously cause it to foam because of being agitated, as it passes through the ports 28 and 29 of the valve.

The novel beer dispensing faucet herein disclosed has been found very practical in operation and because of the unique arrangement of the beer passages and air ducts therein, may be used for dispensing beer, whether extremely wild or substantially flat. By proper manipulation of the valve, the beer may be delivered into the glass with the desired size of head or amount of foam, regardless of the state of the beer in the keg. Also, because of the air intake valve 45 in the upper wall of the pressure chamber, the beer may be quickly drawn from said chamber into a glass without loss of time and in a smooth, non-turbulent stream.

I claim as my invention:

1. A beer dispensing faucet comprising a body having a pressure chamber therein adapted to be connected to a source of beer under pressure and an air supply under pressure, valve means for controlling the supply of air to and from the pressure chamber, and adapted upon initial movement, to admit air into the chamber to create a pressure therein and thereafter to permit beer to flow into the chamber, further movement of said valve means cutting off the supply of beer and air to the chamber and opening the faucet to permit the beer to drain from the chamber into a suitable glass or receptacle, and a disk valve in the upper portion of the chamber adapted to establish communication between said chamber and the atmosphere, when the pressure in the chamber diminishes, whereby the beer may be quickly drawn therefrom without excessive foaming.

2. A beer dispensing faucet comprising a body having a pressure chamber therein adapted to be connected to a source of beer under pressure and an air supply under pressure, valve means for controlling the supply of air to and from the pressure chamber, and adapted upon initial movement, to admit air into the chamber to create a pressure therein and thereafter to permit beer to flow into the chamber, said valve means, upon movement in the opposite direction, cutting off the supply of beer and air to the chamber, and opening the faucet to permit the beer to drain from the chamber into a suitable receiving means, and a disk valve in an upper wall portion of the chamber adapted to open, when the pressure in the chamber diminishes, whereby the beer may be quickly drawn from the chamber without excessive foaming.

3. A beer dispensing faucet comprising a pressure chamber connected to a source of beer under pressure and an air supply under pressure, a valve for controlling the supply of air and beer to and from said chamber and adapted, upon initial movement, to admit air into the chamber to create a pressure therein before beer is admitted into the chamber, whereby the beer will flow into the chamber without turbulence, said valve being so constructed that when it is operated in the opposite direction to draw beer from said chamber, the supply of beer to the chamber is cut off and the air released therefrom, before the valve can be opened to permit the beer to drain from the chamber, and a disk valve in the upper portion of said chamber adapted to be closed by the pressure of the air initially introduced in the chamber, and adapted to open when the pressure in the chamber diminishes, whereby the beer may be quickly drawn from the chamber in a smooth, non-turbulent stream.

4. A beer dispensing faucet comprising a pressure chamber connected to a source of beer under pressure and an air supply under pressure, a valve for controlling the supply of air and beer to and from said chamber and adapted, upon initial movement, to admit air into the chamber to create a pressure therein before beer is admitted into the chamber, whereby the beer will flow into the chamber without turbulence, said valve being so constructed that when it is operated in the opposite direction, the supply of beer to the chamber is cut off, after which the air is released from the chamber through said valve before the latter can be opened to permit the beer to drain from the chamber, and a disk valve in the upper portion of said chamber to prevent the formation of a vacuum therein, when the valve is open, whereby the beer may be quickly drawn from the chamber in a smooth, non-turbulent stream.

5. A beer dispensing faucet comprising a pressure chamber connected to a source of beer under pressure and an air supply under pressure, a valve for controlling the delivery of air and beer into and from said chamber and adapted, upon movement in one direction, to permit air to enter the chamber to create a pressure therein, after which beer is admitted thereto, said valve, when operated in the opposite direction, cutting off the supply of air and beer to said chamber and opening a passage, whereby beer may be drawn from the chamber, and whereby upon continued operation thereof, beer may be drawn directly from the source of supply through a small orifice at high velocity, whereby it is agitated and will discharge from the faucet in the form of foam, and whereby the desired amount of foam may be applied to each glass of beer.

6. A beer dispensing faucet comprising a pressure chamber connected to a source of beer under pressure and an air supply under pressure, a valve for controlling the delivery of air and beer into and from said chamber, and a small orifice in the valve whereby beer may be drawn directly from the source of supply into the glass at high velocity to cause it to foam, and whereby the desired amount of foam may be applied to each glass of beer drawn from the faucet.

7. A beer dispensing faucet comprising a body having a pressure chamber thereon connected to a beer line under pressure and an air supply under pressure, a rotary valve for controlling the delivery of beer and air to and from said chamber, and said valve having a relatively small orifice therein adapted to be alined with the beer supply line, whereby beer may be drawn directly from the beer supply at a high velocity, to thereby cause it to foam and cap the beer in the glass.

8. A beer dispensing faucet comprising a pressure chamber connected to a source of beer under pressure, a valve for controlling the delivery of beer into and from said chamber and adapted, upon movement in one direction, to permit beer to flow into said chamber, and when operated in the opposite direction, to cut off the supply of air to the chamber and open the faucet whereby beer may be drawn from the chamber into a suitable glass, and a small duct in said valve whereby beer may be drawn directly from the source of supply through a small orifice into a glass at high velocity, whereby the beer is agitated and will discharge from the faucet in the form of foam, and whereby the desired amount of foam may be applied to each glass of beer drawn from the faucet.

9. A beer dispensing faucet comprising a body having a pressure chamber thereon and provided with a discharge nozzle, means connecting said body to a source of beer under pressure and an air supply under pressure, a rotary valve for controlling the delivery of air and beer to and from said chamber and adapted upon initial movement to admit air into the chamber to create a pressure therein and upon continued movement, cut off the supply of air to the chamber and permit beer to flow thereinto, said valve being so constructed that when it is operated in the opposite direction, the supply of beer to the chamber is cut off and the air released therefrom, after which the nozzle is opened to permit the beer to drain by gravity from the pressure chamber without turbulence, and said valve having a small orifice therein adapted, upon continued rotation of the valve, to be moved into registration with the beer supply line, whereby beer may be drawn directly from the source of supply and discharged from the nozzle without passing through the chamber, the beer thus delivered to the nozzle from said small orifice flowing at high velocity, whereby it is thoroughly agitated and converted into foam, before it is delivered into the glass and whereby the desired amount of foam may be provided upon each glass of beer drawn from the faucet.

10. A beer dispensing faucet comprising a body having a pressure chamber thereon connected to a source of beer under pressure and an air supply under pressure, a rotary valve for controlling the delivery of beer to and from said chamber, said valve having means embodied in the construction thereof whereby the valve may be operated to cause the beer in the pressure chamber to return by gravity to the source of supply.

11. A beer dispensing faucet comprising a body having a pressure chamber thereon and a beer line connecting it to a source of beer under pressure, and an air supply under pressure, a rotating valve for controlling the delivery of beer to and from said chamber, and a plurality of ports in said valve so arranged with respect to one another that the valve may be positioned to cause all of the beer in the pressure chamber and in the beer line to return by gravity to the source of supply.

12. A beer dispensing faucet comprising a body having a pressure chamber thereon adapted to be connected to a source of beer under pressure and an air supply under pressure, a valve in said body adapted upon rotation in one direction, to permit air to enter the pressure chamber and create a pressure therein, after which beer is delivered to said chamber, said valve being adapted upon movement in the opposite direction to cut off the supply of beer and air to said chamber and to open a discharge nozzle, whereby the beer may be drawn from the chamber into a glass, and the beer passages and air ports in said valve and said valve body being so arranged that when the valve is disposed in a predetermined position, the air pressure in the chamber will equalize the pressure of the beer at its source, whereby the beer in the pressure chamber will drain by gravity back to the source of supply.

13. A beer dispensing faucet comprising a body having a pressure chamber thereon, means for connecting said chamber to a source of beer under pressure, and means for controlling the flow of beer to and from the chamber, said control means being so constructed that when moved to a predetermined position, the beer in the chamber will return by gravity to the source of supply.

14. A beer dispensing faucet comprising a body having a pressure chamber thereon, means for connecting said chamber to a source of beer under pressure, a valve for controlling the flow of beer to and from said chamber, and means embodied in the construction of the valve, whereby when the valve is moved to a predetermined position, air under pressure is admitted into the pressure chamber thereby to permit the beer in the pressure chamber to return by gravity to the source of supply.

15. A beer dispensing faucet comprising a body having a pressure chamber thereon, means connecting the chamber to a source of beer under pressure, and a single valve for controlling the flow of beer to and from the chamber, said valve comprising a plurality of parts which, when moved to a predetermined position, will cause the beer in the chamber to return by gravity to the source of supply.

16. A beer dispensing faucet comprising a body having a pressure chamber thereon adapted to be connected to a source of beer under pressure, and an air supply under pressure, valve means for controlling the supply of air to and from the pressure chamber, and adapted, upon initial movement to admit air into the chamber to create a pressure therein, and thereafter to permit beer to flow into the chamber, a valve for gradually releasing the air pressure from the chamber, whereby the beer may be delivered thereto, further movement of said valve means cutting off the supply of beer and air to the chamber, and opening the faucet to permit the beer to drain from the chamber, and an auxiliary air valve adapted to establish communication between said chamber and the atmosphere, when the pressure in the chamber diminishes, whereby the beer may be quickly drawn from the chamber without excessive foaming.

ELMER H. SMITH.